United States Patent
Hofmann et al.

(10) Patent No.: US 6,586,566 B1
(45) Date of Patent: Jul. 1, 2003

(54) DOUBLE METAL CYANIDE CATALYSTS FOR PRODUCING POLYETHER POLYOLS

(75) Inventors: Jörg Hofmann, Krefeld (DE); Pieter Ooms, Krefeld (DE); Pramod Gupta, Bedburg (DE); Walter Schäfer, Leichlingen (DE); John Lohrenz, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/890,995

(22) PCT Filed: Jan. 31, 2000

(86) PCT No.: PCT/EP00/00728

§ 371 (c)(1),
(2), (4) Date: Aug. 8, 2001

(87) PCT Pub. No.: WO00/47650

PCT Pub. Date: Aug. 17, 2000

(30) Foreign Application Priority Data

Feb. 11, 1999 (DE) .......................... 199 05 611
Mar. 24, 1999 (DE) .......................... 199 13 260
May 7, 1999 (DE) .......................... 199 20 937

(51) Int. Cl.$^7$ .............................. C08G 65/34
(52) U.S. Cl. ................ 528/425; 528/422; 528/482; 528/486; 528/491; 502/175; 502/176; 502/159; 502/200
(58) Field of Search ................ 528/425, 422, 528/482, 486, 491; 502/175, 156, 159, 200, 176

(56) References Cited

U.S. PATENT DOCUMENTS

| | | | |
|---|---|---|---|
| 3,404,109 A | 10/1968 | Milgrom | 260/611 |
| 3,829,505 A | 8/1974 | Herold | 260/611 B |
| 3,941,849 A | 3/1976 | Herold | 260/607 A |
| 5,158,922 A | 10/1992 | Hinney et al. | 502/175 |
| 5,470,813 A | 11/1995 | Le-Khac | 502/175 |
| 5,545,601 A | 8/1996 | Le-Khac | 502/156 |
| 5,627,120 A | 5/1997 | Le-Khac | 502/156 |
| 5,714,428 A | 2/1998 | Le-Khac | 502/159 |
| 6,018,077 A | 1/2000 | Ohkoshi et al. | 528/421 |

FOREIGN PATENT DOCUMENTS

| | | |
|---|---|---|
| EP | 0 693 513 | 1/1996 |
| EP | 700 949 | 3/1999 |
| JP | 4-145123 | 5/1992 |
| WO | 97/40086 | 10/1997 |

OTHER PUBLICATIONS

Ullmanns Encyc. der Industriellen Chemie, English language edition (month unavailable), 1992, vol. A21, pp. 760–671, "3.2. Polyols".

Kunststoffhandbuch, vol. 7, Polyurethane, $3^{rd}$ edition, (month unavailable), 1993, pp. 25–32, Prof. Dr. D. Dieterich & Dr. H.G. Schmelzer, Herstellungsmethoden für Polyurethane.

Kunststoffhandbuch, vol. 7, Polyurethane, $3^{rd}$ edition, (month unavailable), 1993, pp. 57–67, Polyole, Dr. K. Schauerte, Dr. P. Gupta.

*Primary Examiner*—Duc Truong
(74) *Attorney, Agent, or Firm*—Joseph C. Gil; John E. Mrozinski, Jr.

(57) ABSTRACT

This invention relates to novel double metal cyanide (DMC) catalysts for the production of polyether polyols by polyaddition of alkylene oxides onto starter compounds having active hydrogen atoms, wherein the catalyst contains a) double metal cyanide compounds, b) organic complex ligands other than c) and c) ionic surface- or interface-active compounds. The catalysts according to the invention have greatly increased activity in the production of polyether polyols.

19 Claims, No Drawings

DOUBLE METAL CYANIDE CATALYSTS FOR PRODUCING POLYETHER POLYOLS

This invention relates to novel double metal cyanide (DMC) catalysts for the production of polyether polyols by polyaddition of alkylene oxides onto starter compounds having active hydrogen atoms.

Double metal cyanide (DMC) catalysts for the polyaddition of alkylene oxides onto starter compounds having active hydrogen atoms are known (c.f. for example U.S. Pat. Nos. 3,404,109, 3,829,505, 3,941,849 and 5,158,922). Using these DMC catalysts for the production of polyether polyols in particular brings about a reduction in the proportion of monofunctional polyethers with terminal double bonds, so-called monools, in comparison with the conventional production of polyether polyols by means of alkali metal catalysts, such as alkali metal hydroxides. The resultant polyether polyols may be further processed to yield high-grade polyurethanes (for example elastomers, foams, coatings). DMC catalysts are usually obtained by reacting an aqueous solution of a metal salt with the aqueous solution of a metal cyanide salt in the presence of an organic complex ligand, for example an ether. In one typical catalyst preparation method, aqueous solutions of zinc chloride (in excess) and potassium hexacyanocobaltate are, for example, mixed and dimethoxyethane (glyme) is then added to the resultant suspension. Once the catalyst has been filtered and washed with aqueous glyme solution, an active catalyst of the general formula

$$Zn_3[Co(CN)_6]_2 \cdot xZnCl_2 \cdot yH_2O \cdot zglyme$$

is obtained (c.f. for example EP-A 700 949).

JP-A 4 145 123, U.S. Pat. No. 5,470,813, EP-A 700 949, EP-A 743 093, EP-A 761 708 and WO 97/40086 disclose DMC catalysts which, by using tert.-butanol as an organic complex ligand (alone or in combination with a polyether (EP-A 700 949, EP-A 761 708, WO 97/40086)), further reduce the proportion of monofunctional polyethers with terminal double bonds in the production of polyether polyols. Moreover, using these DMC catalysts also reduces the induction time in the polyaddition reaction of the alkylene oxides with appropriate starter compounds and increases catalyst activity.

The object of the present invention was to provide further improved DMC catalysts for the polyaddition of alkylene oxides onto appropriate starter compounds, which catalysts exhibit increased catalyst activity in comparison with hitherto known catalyst types. By shortening the alkoxylation times, this improves the economic viability of the polyether polyol production process. Ideally, by virtue of its increased activity, the catalyst may then be used in such low concentrations (25 ppm or below) that it is no longer necessary to perform the highly elaborate separation of the catalyst from the product and the product may be used directly for polyurethane production.

It has surprisingly now been found that DMC catalysts which contain an ionic surface- or interface-active compound as a complex ligand exhibit greatly increased activity in polyether polyol production.

The present invention accordingly provides a double metal cyanide (DMC) catalyst containing a) one or more, preferably one, double metal cyanide compounds, b) one or more, preferably one, complex ligands other than c), and c) one or more, preferably one, ionic surface- or interface-active compounds.

The catalyst according to the invention may optionally contain d) water, preferably 1 to 10 wt. %, and/or e) one or more water-soluble metal salts, preferably 5 to 25 wt. %, of the formula (I) M(X)$_n$, originating from the production of the double metal cyanide compounds a). In the formula (I), M is selected from among the metals Zn(II), Fe(II), Ni(II), Mn(II), Co(II), Sn(II), Pb(II), Fe(III), Mo(IV), Mo(VI), Al(III), V(V), V(IV), Sr(II), W(IV), W(VI), Cu(II) and Cr(III). Zn(II), Fe(II), Co(II) and Ni(II) are particularly preferred. The anions X are identical or different, preferably identical, and preferably selected from the group comprising halides, hydroxides, sulfates, carbonates, cyanates, thiocyanates, isocyanates, isothiocyanates, carboxylates, oxalates or nitrates. The value for n is 1, 2 or 3.

The double metal cyanide compounds a) present in the catalysts according to the invention are the reaction products of water-soluble metal salts and water-soluble metal cyanide salts.

Water-soluble metal salts suitable for the production of double metal cyanide compounds a) preferably have the general formula (I) M(X)$_n$, wherein M is selected from among the metals Zn(II), Fe(II), Ni(II), Mn(II), Co(II), Sn(II), Pb(II), Fe(III), Mo(IV), Mo(VI), Al(III), V(V), V(IV), Sr(II), W(IV), W(VI), Cu(II) and Cr(III). Zn(II), Fe(II), Co(II) and Ni(II) are particularly preferred. The anions X are identical or different, preferably identical, and preferably selected from the group comprising halides, hydroxides, sulfates, carbonates, cyanates, thiocyanates, isocyanates, isothio-cyanates, carboxylates, oxalates or nitrates. The value for n is 1, 2 or 3.

Examples of suitable water-soluble metal salts are zinc chloride, zinc bromide, zinc acetate, zinc acetylacetonate, zinc benzoate, zinc nitrate, iron(II) sulfate, iron(II) bromide, iron(II) chloride, cobalt(II) chloride, cobalt(II) thiocyanate, nickel(II) chloride and nickel(II) nitrate. Mixtures of various water-soluble metal salts may also be used.

Water-soluble metal cyanide salts suitable for the production of double metal cyanide compounds a) preferably have the general formula (II), (Y)$_a$M'(CN)$_b$(A)$_c$, wherein M' is selected from among the metals Fe(II), Fe(III), Co(II), Co(III), Cr(II), Cr(III), Mn(II), Mn(III), Ir(III), Ni(II), Rh(III), Ru(II), V(IV) and V(V). M' is particularly preferably selected from among the metals Co(II), Co(III), Fe(II), Fe(III), Cr(III), Ir(III) and Ni(II). The water-soluble metal cyanide salt may contain one or more of these metals. The cations Y are identical or different, preferably identical, and are selected from among the group comprising alkali metal ions and alkaline earth metal ions. The anions A are identical or different, preferably identical, and are selected from among the group of halides, hydroxides, sulfates, carbonates, cyanates, thiocyanates, isocyanates, isothiocyanates, carboxylates, oxalates or nitrates. Not only a, but also b and c are integers, wherein the values for a, b and c are selected such that electron-neutrality of the metal cyanide salt is ensured; a is preferably 1, 2, 3 or 4; b is preferably 4, 5 or 6; c preferably has the value 0. Examples of suitable water-soluble metal cyanide salts are potassium hexacyanocobaltate(III), potassium hexacyanoferrate(II), potassium hexacyanoferrate(III), calcium hexacyanocobaltate(III) and lithium hexacyanocobaltate(III).

Preferred double metal cyanide compounds a), which are present in the catalysts according to the invention, are compounds of the general formula (III)

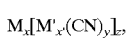
$$M_x[M'_{x'}(CN)_y]_z,$$

in which

M is defined as in the formula (I) and
M' as in the formula (II), and
x, x', y and z are integers and selected such that electron-neutrality of the double metal cyanide compound is ensured.
Preferably
x=3, x'=1, y=6 and z=2,
M=Zn(II), Fe(II), Co(II) or Ni(II) and
M'=Co(III), Fe(III), Cr(III) or Ir(III).

Examples of suitable double metal cyanide compounds a) are zinc hexacyanocobaltate(III), zinc hexacyanoiridate(ll), zinc hexacyanoferrate(III) and cobalt(II) hexacyanocobaltate(III). Further examples of suitable double metal cyanide compounds may be found, for example, in U.S. Pat. No. 5,158,922. Zinc hexacyanocobaltate(III) is particularly preferably used.

The organic complex ligands b) present in the DMC catalysts according to the invention are known in principle and have been exhaustively described in the prior art (for example in U.S. Pat. Nos. 5,158,922, 3,404,109, 3,829,505, 3,941,849, EP-A 700 949, EP-A 761 708, JP-A 4 145 123, U.S. Pat. No. 5,470,813, EP-A 743 093 and WO 97/40086). Preferred organic complex ligands are water-soluble, organic compounds having heteroatoms, such as oxygen, nitrogen, phosphorus or sulfur, which may form complexes with the double metal cyanide compound a). Suitable organic complex ligands are, for example, alcohols, aldehydes, ketones, ethers, esters, amides, ureas, nitriles, sulfides and mixtures thereof. Preferred organic complex ligands are water-soluble aliphatic alcohols, such as ethanol, isopropanol, n-butanol, isobutanol, sec.-butanol and tert.-butanol. tert.-Butanol is particularly preferred.

The organic complex ligand is added either during preparation of the catalyst or immediately after precipitation of the double metal cyanide compound a). The organic complex ligand is normally used in excess.

The DMC catalysts according to the invention contain the double metal cyanide compounds a) in quantities of 20 to 90 wt. %, preferably of 25 to 80 wt. %, relative to the quantity of the finished catalyst, and the organic complex ligands b) in quantities of 0.5 to 30, preferably of 1 to 25 wt. %, relative to the quantity of the finished catalyst. The DMC catalysts according to the invention conventionally contain 1 to 80 wt. %, preferably 1 to 40 wt. %, relative to the quantity of the finished catalyst, of ionic surface- or interface-active compounds c).

The structural feature of the ionic surface- or interface-active compounds c) suitable for the production of the catalysts according to the invention is the amphiphilic molecular structure thereof, i.e. they contain at least one hydrophilic ionic group (or hydrophilic ionic molecular moiety) and at least one hydrophobic group (or hydrophobic molecular moiety). Examples of such ionic surface- or interface-active compounds may be found in the group of surfactants, soaps, emulsifiers, detergents and dispersants.

The hydrophilic ionic groups may be of an anionic, cationic or zwitterionic (amphoteric) nature. Examples of anionic groups are carboxylate, sulfonate, sulfate, thiosulfate, phosphonate, phosphinate, phosphate or dithiophosphate groups. Examples of cationic groups are ammonium, phosphonium or sulfonium groups. Examples of zwitterionic groups are betaine, sulfobetaine or amine oxide groups.

The hydrophobic groups are preferably $C_2$–$C_{50}$ hydrocarbon residues such as aryl, aralkyl and alkyl residues. Fluoroalkyl, silaalkyl, thiaalkyl or oxaalkyl groups are, however, also suitable.

Examples of suitable classes of compounds having hydrophilic anionic groups are carboxylates such as alkylcarboxylates (soaps), ether carboxylates (carboxy-methylated ethoxylates), polycarboxylates such as malonates and succinates, bile acid salts, for example bile acid amides having sulfoalkyl and carboxyalkyl residues in the salt form, amino acid derivatives such as sarcosides (alkanoylsarcosinates), sulfonamidocarboxylates, sulfates, such as alkyl sulfates, ether sulfates, for example: fatty alcohol ether sulfates, aryl ether sulfates or amido ether sulfates, sulfated carboxylates, sulfated carboxylic acid glycerides, sulfated carboxylic acid esters, sulfated carboxylic acid amides, sulfonates, for example alkyl-, aryl- and alkylarylsulfonates, sulfonated carboxylates, sulfonated carboxylic acid esters, sulfonated carboxylic acid amides, carboxyl ester sulfonates, such as $\alpha$-sulfo fatty acid esters, carboxyamide sulfonates, sulfosuccinic acid esters, ether sulfonates, thiosulfates, phosphates, for example alkylphosphates or glycerol phosphates, phosphonates, phosphinates and dithiophosphates.

Examples of suitable classes of compounds having hydrophilic cationic groups are primary, secondary, tertiary and quaternary ammonium salts having alkyl, aryl and aralkyl residues, alkoxylated ammonium salts, quaternary ammonium esters, benzylammonium salts, alkanolammonium salts, pyridinium salts, imidazolinium salts, oxazolinium salts, thiazolinium salts, salts of amine oxides, sulfonium salts, quinolinium salts, isoquinolinium salts and tropylium salts.

Examples of suitable classes of compounds having hydrophilic zwitterionic (amphoteric) groups are amine oxides, imidazolinium derivatives, such as imidazolinium carboxylates, betaines, for example alkyl- and amidopropylbetaines, sulfobetaines, aminocarboxylic acids and phospholipids, for example phosphatidylcholine (lecithin).

The ionic surface- or interface-active compounds may, of course, also contain two or more hydrophilic (anionic and/or cationic and/or zwitterionic) groups or molecular moieties.

The ionic surface- or interface-active compounds c) may be used individually or in combination.

The ionic surface- or interface-active compounds suitable for the production of the catalysts according to the invention are generally well known and have been exhaustively described, for example, in *Ullmann's Encyclopedia of Industrial Chemistry*, 5$^{th}$ edition, volume A25, pp. 747–817, V C H, Weinheim, 1994, *Kirk-Othmer Encyclopedia of Chemical Technology*, 4$^{th}$ edition, volume 23, pp. 477–541, John Wiley & Sons, New York, 1997, *Tensid-Taschenbuch*, 2$^{nd}$ edition, H. Stache (ed.), Carl Hanser Verlag, Munich, 1982, *Surfactant Science Series*, volumes 1–74, M. J. Schick (consulting editor), Marcel Decker, New York, 1967–1998, *Methods in Enzymology*, volume 182, M. P. Deutscher (ed.), pp. 239–253, Academic Press, San Diego, 1990.

Catalyst composition is conventionally analysed by means of elemental analysis, thermogravimetry or extractive removal of the moiety of the ionic surface- or interface-active compound with subsequent gravimetric determination.

The catalysts according to the invention may be crystalline, partially crystalline or amorphous. Crystallinity is conventionally analysed by powder X-ray diffractometry.

Catalysts according to the invention containing
a) zinc hexacyanocobaltate(III),
b) tert.-butanol and
c) an ionic surface- or interface-active compound
are preferred.

The DMC catalysts according to the invention are conventionally produced in an aqueous solution by reacting α) metal salts, in particular of the formula (I), with metal cyanide salts, in particular of the formula (II), β) organic complex ligands b), which are not surface- or interface-active compounds and γ) ionic surface- or interface-active compounds c).

In this case, the aqueous solutions of the metal salt (for example zinc chloride used in stoichiometric excess (at least 50 mol % relative to the metal cyanide salt)) and the metal cyanide salt (for example potassium hexacyanocobaltate) are preferably first reacted in presence of the organic complex ligand b) (for example tert.-butanol), wherein a suspension forms which contains the double metal cyanide compound a) (for example zinc hexacyanocobaltate), water d), excess metal salt e), and the organic complex ligand b).

The organic complex ligand b) may here be present in the aqueous solution of the metal salt and/or of the metal cyanide salt, or it is added directly to the suspension obtained after precipitation of the double metal cyanide compound a). It has proved advantageous to mix the aqueous solutions and the organic complex ligand b) with vigorous stirring. The resultant suspension is then conventionally treated with one or more ionic surface- or interface-active compound(s) c). Component c) is here preferably used in a mixture with water and the organic complex ligand b).

The catalyst is then isolated from the suspension using known methods, such as centrifugation or filtration. In a preferred varied embodiment, the isolated catalyst is then washed with an organic solution of the organic complex ligand b) (for example by being resuspended and then isolated again by filtration or centrifugation). In this manner, it is possible to remove, for example, water-soluble secondary products, such as potassium chloride, from the catalyst according to the invention.

The quantity of the organic complex ligand b) in the aqueous washing solution is preferably between 40 and 80 wt. %, relative to the entire solution. It is furthermore advantageous to add to the aqueous washing solution a small quantity, preferably 0.5 to 5 wt. %, relative to the entire solution, of the ionic surface- or interface-active compound(s) c) used as component γ).

It is moreover advantageous to wash the catalyst more than once. The first washing operation may, for example, be repeated for this purpose. It is, however, preferred to use non-aqueous solutions for further washing operations, for example a mixture of the organic complex ligand and the ionic surface- or interface-active compound(s) c) used as component γ).

The washed catalyst, optionally after being pulverised, is then dried at temperatures of in general 20 to 100° C. and at pressures of in general 0.1 mbar to standard pressure (1013 mbar).

The present invention furthermore provides the use of the DMC catalysts according to the invention in a process for the production of polyether polyols by polyaddition of alkylene oxides onto starter compounds having active hydrogen atoms.

Preferably used alkylene oxides are ethylene oxide, propylene oxide, butylene oxide and mixtures thereof. Synthesis of the polyether chains by alkoxylation may be performed, for example, with only one monomeric epoxide or may also proceed randomly or in blocks with 2 or 3 different monomeric epoxides. Further details may be found in *Ullmanns Encyclopädie der industriellen Chemie*, volume A21, 1992, pp. 670 et seq.

Starter compounds having active hydrogen atoms are preferably compounds having (number average) molecular weights of 18 to 2000 and 1 to 8 hydroxyl groups. The following may be mentioned by way of example: ethylene glycol, diethylene glycol, triethylene glycol, 1,2-propylene glycol, 1,4-butanediol, hexamethylene glycol, bisphenol A, trimethylolpropane, glycerol, pentaerythritol, sorbitol, cane sugar, degraded starch or water.

Starter compounds having active hydrogen atoms which are used are advantageously those which have been produced, for example, by conventional alkali metal catalysis from the above-stated low molecular weight starter compounds and comprise oligomeric alkoxylation products having (number average) molecular weights of 200 to 2000.

The polyaddition of alkylene oxides onto starter compounds having active hydrogen atoms catalysed by the catalysts according to the invention generally proceeds at temperatures of 20 to 200° C., preferably in the range from 40 to 180° C., particularly preferably at temperatures of 50 to 150° C. The reaction may be performed at total pressures of 0.0001 to 20 bar. Polyaddition may be performed without solvents or in an inert, organic solvent, such as toluene and/or THF. The quantity of solvent is conventionally 10 to 30 wt. %, relative to the quantity of polyether polyol to be produced.

Catalyst concentration is selected such that, under the stated reaction conditions, the polyaddition reaction may be maintained under good control. The catalyst concentration is generally in the range from 0.0005 wt. % to 1 wt. %, preferably in the range from 0.001 wt. % to 0.1 wt. %, particularly preferably in the range from 0.001 to 0.0025 wt. %, relative to the quantity of polyether polyol to be produced.

The (number average) molecular weights of the polyether polyols produced using the process according to the invention are in the range from 500 to 100000 g/mol, preferably in the range from 1000 to 50000 g/mol, particularly preferably in the range from 2000 to 20000 g/mol.

Polyaddition may be performed continuously or discontinuously, for example in a batch or semi-batch process.

By virtue of their distinctly increased activity, the catalysts according to the invention may be used in very low concentrations (25 ppm and below, relative to the quantity of polyether polyol to be produced). If the polyether polyols produced in the presence of the catalysts according to the invention are used in the production of polyurethanes (*Kunststoffhandbuch*, volume 7, *Polyurethane*, $3^{rd}$ edition 1993, pp. 25–32 and 57–67), it is possible to dispense with removing the catalyst from the polyether polyol, without having any negative impact on the product qualities of the polyurethane so obtained.

EAMPLES

Catalyst Preparation

Example A

Production of a DMC Catalyst with Cholic Acid Sodium Salt (Catalyst A)

A solution of 6.2 g (45.75 mmol) of zinc chloride in 10 ml of distilled water is added with vigorous stirring (24000 rpm) to a solution of 2 g (6 mmol) of potassium hexacyanocobaltate in 35 ml of distilled water. Immediately thereafter, a mixture of 25 g of tert.-butanol and 25 g of distilled water is added to the resultant suspension and then stirred vigorously for 10 minutes (24000 rpm). A mixture of 0.5 g of cholic acid sodium salt (Fluka Chemie AG, CH-9471 Buchs), 0.5 g of tert.-butanol and 50 g of distilled water is then added and stirred for 3 minutes (1000 rpm). The solid is isolated by filtration, then stirred (10000 rpm) for 10 minutes with a mixture of 35 g of tert.-butanol, 15 g of distilled water and 0.5 g of cholic acid sodium salt and refiltered. The product is then once more stirred (10000 rpm) for 10 minutes with a mixture of 50 g of tert.-butanol and 0.25 g of cholic acid sodium salt. After filtration, the catalyst is dried to constant weight at 50° C. and standard pressure.

Yield of dry, pulverulent catalyst: 2.1 g

Elemental analysis, thermogravimetric analysis and extraction:

Cobalt=12.6 wt. %, zinc=27.3 wt. %, tert.-butanol=10.9 wt. %, cholic acid sodium salt=4.3 wt. %.

Example B

Production of a DMC Catalyst with L-α-lecithin (Catalyst B)

The same method was used as in Example A, but using L-α-lecithin (from egg yolk, Fluka Chemie AG, CH-9471 Buchs) instead of cholic acid sodium salt.

Yield of dry, pulverulent catalyst: 2.0 g

Elemental analysis, thermogravimetric analysis and extraction:

Cobalt=13.7 wt. %, zinc=25.6 wt. %, tert.-butanol=7.5 wt. %, L-α-lecithin=12.0 wt. %.

Example C

Production of a DMC Catalyst with N-lauroylsarcosine Sodium Salt (Catalyst C)

The same method was used as in Example A, but using N-lauroylsarcosine sodium salt (Fluka Chemie AG, CH-9471 Buchs) instead of cholic acid sodium salt.

Yield of dry, pulverulent catalyst: 1.95 g

Elemental analysis, thermogravimetric analysis and extraction:

Cobalt=13.2 wt. %, zinc=28.6 wt. %, tert.-butanol=9.5 wt. %, N-lauroylsarcosine sodium salt=6.2 wt. %.

Example D (Comparative Example)

Production of a DMC catalyst using tert.-butanol without an ionic surface- or interface-active compound (catalyst D, synthesis in accordance with JP-A 4145123).

A solution of 10 g (73.3 mmol) of zinc chloride in 15 ml of distilled water is added with vigorous stirring (24000 rpm) to a solution of 4 g (12 mmol) of potassium hexacyanocobaltate in 75 ml of distilled water. Immediately thereafter, a mixture of 50 g of tert.-butanol and 50 g of distilled water is added to the resultant suspension and then stirred vigorously for 10 minutes (24000 rpm). The solid is isolated by filtration, then stirred (10000 rpm) for 10 minutes with a mixture of tert.-butanol and, distilled water (in a 70:30 ratio by weight) and refiltered. The product is then once more stirred (10000 rpm) for 10 minutes with 125 g of tert.-butanol. After filtration, the catalyst is dried to constant weight at 50° C. and standard pressure.

Yield of dry, pulverulent catalyst: 3.08 g

Elemental analysis:

Cobalt=13.6 wt. %, zinc=27.4 wt. %, tert.-butanol=14.2 wt. %.

Production of Polyether Polyols

General Method 50 g of polypropylene glycol starter compound (number average molecular weight=1000 g/mol) and 3 to 5 mg of catalyst (15 to 25 ppm, relative to the quantity of polyether polyol to be produced) are initially introduced into a 500 ml autoclave under protective gas (argon) and heated to 105° C. while being stirred. Propylene oxide (approx. 5 g) is then added in a single portion until the total pressure has risen to 2.5 bar. No further propylene oxide is then apportioned until an accelerated pressure drop is observed in the reactor. This accelerated pressure drop indicates that the catalyst has been activated. The remaining propylene oxide (145 g) is then continuously apportioned at a constant total pressure of 2.5 bar. Once all the propylene oxide has been apportioned and after 2 hours' post-reaction at 105° C., volatile fractions are removed by distillation at 90° C. (1 mbar) and then cooled to room temperature.

The resultant polyether polyols were characterised by determining their OH values, double bond contents and viscosities.

The course of the reaction was monitored using time/conversion curves (propylene oxide consumption [g] vs. reaction time [min]). The induction time was determined from the intersection of the tangent to the steepest point of the time/conversion curve with the extended baseline of the curve. The propoxylation times of significance to catalyst activity correspond to the period between catalyst activation (end of induction period) and completion of propylene oxide addition. The total reaction time is the sum of the induction time and propoxylation time.

Example 1

| | |
|---|---|
| Production of polyether polyol with catalyst A (15 ppm) | |
| Induction time: | 230 min |
| Propoxylation time: | 95 min |
| Total reaction time: | 325 min |
| Polyether polyol: | |
| OH value (mg KOH/g): | 28.9 |
| Double bond content (mmol/kg): | 4 |
| Viscosity, 25° C. (mPas): | 982 |

If the catalyst is not removed, the metal content in the polyol is: Zn=4 ppm, Co=2 ppm.

Example 2

| | |
|---|---|
| Production of polyether polyol with catalyst B (25 ppm) | |
| Induction time: | 125 min |
| Propoxylation time: | 140 min |
| Total reaction time: | 265 min |
| Polyether polyol: | |
| OH value (mg KOH/g): | 29.5 |
| Double bond content (mmol/kg): | 6 |
| Viscosity, 25° C. (mPas): | 921 |

Example 3

| | |
|---|---|
| Production of polyether polyol with catalyst C (25 ppm) | |
| Induction time: | 350 min |
| Propoxylation time: | 40 min |
| Total reaction time: | 390 min |
| Polyether polyol: | |
| OH value (mg KOH/g): | 30.4 |
| Double bond content (mmol/kg): | 6 |
| Viscosity, 25° C. (mPas): | 842 |

Example 4

(Comparison)

Under the reaction conditions described above, catalyst D (15 ppm) exhibits no activity even after an induction time of 14 hours.

When 50 ppm of catalyst D were used, the induction time was approx. 9 hours. Propoxylation time was more than 12 hours, with the catalyst being deactivated over the course of the reaction.

Examples 1–3 show that, by virtue of their distinctly increased activity, the novel dmc catalysts according to the invention may be used in the production of polyether polyols in such low concentrations that it is possible to dispense with separating the catalyst from the polyol.

What is claimed is:

1. A double-metal cyanide catalyst comprising:
   a). at least one double-metal cyanide compound;
   b). at least one organic complex ligand which is not an ionic-surface or interface-active compound; and
   c). at least one monomeric ionic-surface or interface-active compound.

2. The double-metal cyanide catalyst according to claim 1, further comprising water and/or one or more water-soluble metal salts.

3. The double-metal cyanide catalyst according to claim 1, wherein the double-metal cyanide compound is zinc hexacyanocobaltate (III).

4. The double-metal cyanide catalyst according to claim 1, wherein the organic complex ligand comprises an alcohol, aldehyde, ketone, ether, ester, amide, urea, nitrile, sulfide and/or a mixture thereof.

5. The double-metal cyanide catalyst according to claim 1, wherein the organic complex ligand is tert.-butanol.

6. The double-metal cyanide catalyst according to claim 1, wherein the at least one monomeric ionic-surface or interface-active compound is present in an amount of from about 1 to about 80 wt. %, based on the amount of finished double-metal cyanide catalyst.

7. The double-metal cyanide catalyst according to claim 1, wherein the at least one monomeric ionic-surface or interface-active compound is present in an amount of from about 1 to about 40 wt. %, based on the amount of finished double-metal cyanide catalyst.

8. The double-metal cyanide catalyst according to claim 1, wherein the at least one monomeric ionic-surface or interface-active compound comprises at least one hydrophilic anionic group.

9. The double-metal cyanide catalyst according to claim 1, wherein the at least one monomeric ionic-surface or interface-active compound comprises at least one hydrophilic cationic group.

10. The double-metal cyanide catalyst according to claim 1, wherein the at least one monomeric ionic-surface or interface-active compound comprises at least one hydrophilic zwitterionic group.

11. The double-metal cyanide catalyst according to claim 8, wherein the hydrophilic anionic group is a member selected from the group consisting of carboxylate, sulfonate, sulfate, thiosulfate, phosphonate, phosphinate, phosphate and dithiophosphate.

12. The double-metal cyanide catalyst according to claim 9, wherein the hydrophilic cationic group is a member selected from the group consisting of ammonium, phosphonium, and sulfonium.

13. The double-metal cyanide catalyst according to claim 10, wherein the hydrophilic zwitterionic group is a member selected from the group consisting of betaine, sulfobetaine and amine oxide.

14. A process for the preparation of a double-metal cyanide catalyst comprising the steps of: (a) reacting, in aqueous solution, (i) at least one metal salt, (ii) with at least one metal cyanide salt, in the presence of (iii) an organic complex ligand, which is not an ionic-surface or interface-active compound, to form a suspension; and (b) treating the suspension with at least one monomeric ionic-surface or interface-active compound.

15. The process according to claim 14, further including the steps of: (c) isolating the catalyst from suspension after step (b); (d) washing the isolated catalyst; and (e) drying the isolated catalyst.

16. In a process for the production of a polyether polyol by polyaddition of an alkylene oxide onto a starter compound containing active hydrogen atoms the improvement comprising conducting the polyaddition of alkylene oxide in the presence of the double-metal cyanide catalyst of claim 1.

17. The polyether polyol prepared by the process of claim 16.

18. A double-metal cyanide catalyst according to claim 1, wherein the double-metal cyanide catalyst is used for the production of a polyether polyol by polyaddition of alkylene oxides onto starter compounds having active hydrogen atoms.

19. A double-metal cyanide catalyst comprising:
   a). at least one double-metal cyanide compound;
   b). at least one organic complex ligand which is not an amphiphillic ionic-surface or interface-active compound; and
   c). at least one amphiphillic ionic-surface or interface-active compound.

* * * * *